United States Patent [19]
Tajalli et al.

[11] Patent Number: 5,361,359
[45] Date of Patent: Nov. 1, 1994

[54] SYSTEM AND METHOD FOR CONTROLLING THE USE OF A COMPUTER

[75] Inventors: Homayoon Tajalli, Ellicott City; Mark L. Badger; David I. Dalva, both of Rockville; Stephen T. Walker, Glenwood, all of Md.

[73] Assignee: Trusted Information Systems, Inc., Glenwood, Md.

[21] Appl. No.: 937,424

[22] Filed: Aug. 31, 1992

[51] Int. Cl.$^5$ .............................................. H04L 9/00
[52] U.S. Cl. ............................ 395/700; 364/DIG. 2; 364/918.7; 340/825.31
[58] Field of Search ............................. 395/650, 700; 364/969.4, 969.3, 246.6, 246.9

[56] References Cited

U.S. PATENT DOCUMENTS

| | | | |
|---|---|---|---|
| 3,827,029 | 7/1974 | Schlotterer et al. | 340/172.5 |
| 4,200,770 | 4/1980 | Hellman et al. | 178/22 |
| 4,757,533 | 7/1988 | Allen et al. | 380/25 |
| 4,885,789 | 12/1989 | Burger et al. | 380/25 |
| 4,918,653 | 4/1990 | Johri et al. | 364/900 |
| 5,012,515 | 4/1991 | McVitie | 380/49 |
| 5,032,979 | 7/1991 | Hecht et al. | 364/200 |
| 5,224,160 | 6/1993 | Paulini et al. | 380/4 |
| 5,263,147 | 11/1993 | Francisco et al. | 395/425 |
| 5,272,754 | 12/1993 | Boerbert | 380/25 |

FOREIGN PATENT DOCUMENTS

| | | |
|---|---|---|
| 0325776A2 | 8/1989 | European Pat. Off. . |
| 0432333A1 | 6/1991 | European Pat. Off. . |
| 0468625A2 | 1/1992 | European Pat. Off. . |

OTHER PUBLICATIONS

IBM Technical Disclosure Bulletin, vol. 34, No. 8, Jan. 1992, New York, US; pp. 214–215; Mechanism for Trusted Computing Base Isolation.
Final Evaluation Report, Secure Communications Processor (SCOMP), Release 2.1, CSC-EPL-85/001, 1985.
Saydjari, et al., Locking Computers Securely, 10th National Computer Security Conference Proceedings, 21–24 Sep. 1987.
Maria M. King, Identifying and Controlling Undesirable Program Behaviors, 14th National Computer Security Conference, Oct. 1–4, 1991, Omni Shoreham Hotel, Washington, D.C.
Russell Davis, PRC, Inc., Peeling the Viral Onion, 14th National Computer Security Conference, Oct. 1–4, 1991, Omni Shoreham Hotel, Washington, D.C.
Final Evaluation Report of International Business Machines Corporation, VM/SP with RACF, 28 Sep. 1989, National Computer Security Center, CSC-EPL-89/005.
Final Evaluation Report of Unisys Corporation, OS 1100, Sep. 27, 1989, National Computer Security Center, CSC-EPL-89/004.
Final Evaluation Report of Digital Equipment Corporation, VAX/VMS Version 4.3, 30 Jul. 1986, National Computer Security Center, CSC-EPL-86/004.
Final Evaluation Report of Trusted Information Systems Incorporated, Trusted Xenix, 22 Jan. 1991, National Computer Security Center, CSC-EPL-91/003, C—Evaluation No. 01–92.
Operating Systems by H. M. Deitel pp. 535, 541, 542, 1990.
Unix System Security by Rik Farrow, 1990, pp. 9–12, 55, 56, 203–205.

Primary Examiner—Gareth D. Shaw
Assistant Examiner—Michael T. Richey
Attorney, Agent, or Firm—Sterne, Kessler, Goldstein & Fox

[57] ABSTRACT

A system and method for auditing and controlling the use of a computer. An operating system and selected programs and data, referred to as approved applications and approved data, are stored on a protected media which cannot be modified by any ordinary user or application program, regardless of operating system privilege. The protected media can be modified by the operating system, as well as by an administrator using a trusted path mechanism. The trusted path mechanism establishes a reliable communication channel between the administrator and the computer system. The present invention may be configured to collect user audit data concerning user activity and system status and to write the audit data to the protected media. Also, the present invention may be configured to limit execution of application programs to the approved applications.

33 Claims, 10 Drawing Sheets

SYSTEM AND METHOD FOR CONTROLLING THE USE OF A COMPUTER

CROSS-REFERENCE TO OTHER APPLICATIONS

The following application of common assignee contains some common disclosure and is believed to have the same effective filing date as the present invention: SYSTEM AND METHOD FOR CONTROLLING THE USE OF A COMPUTER AT A REGULATED SITE

BACKGROUND OF THE INVENTION

1. Field of the Invention

The present invention relates generally to controlling the use of a computer system and, more particularly, to a system and method for restricting access to specified application programs and/or data and to reliably auditing computer usage.

2. Related Art

Computer Security

Many organizations (e.g., businesses, government agencies) wish to control how data will be processed or stored by computer systems that are owned, operated by, or otherwise related to the organizations. The field of computer security is broadly concerned with designing and building computer systems that permit organizations that employ computer systems to control how data is processed using the computing systems according to particular security policies. A security policy (in this context) is a set of rules about how data may be processed.

The need to control how computer systems are used is related to organizational goals. For example, a business might want to protect inventory records from unauthorized modifications; a government agency processing sensitive information might want to control access to data so that users can only access information according to their security clearances. To allow organizations control over their computer systems, many conventional computer systems provide security controls that allow a computer system administrator to limit the actions that may be taken by users of the computer system. Security controls fall broadly into two groups: discretionary controls and mandatory controls.

Discretionary security controls are generally based on the identity of users as they are known to a computer system and the "ownership of" or "control over" data stored for particular users by the computer system. Each user can employ discretionary controls to reduce the access of other users to data that is owned or controlled by that user. A weakness of discretionary controls is that, in conventional computer systems, each application program that is executed by a user possesses all of that user's discretionary rights and can use those rights to change controls on the user's data contrary to the user's wishes. An application program that is designed to do this is known as a "Trojan Horse" program because it often performs an undesirable function without the user's knowledge.

Mandatory security controls are generally based on some computer system-maintained attribute of users and the data that users access. Often, this attribute is a "security level" that is used by the computer system to decide if a particular user may access data stored on the computer system. For instance, a user with a "Confidential" clearance may be prohibited access to data that is classified as "Top Secret."

The mandatory and discretionary controls are implemented, at least in part, by an operating system of the computer system. The operating system is a body of software that controls (i.e., manages the usage of) physical resources such as central processing units (CPU)s, random access memory (RAM) (also referred to as "memory"), disk drives, networks, monitors, etc. By managing these resources, the software provides a way for users and application programs to use the resources in a more convenient way. The operating system includes a kernel, or resident portion, that is always in RAM. The kernel acts as the "traffic cop" to manage both other pans of the operating system and the application programs. Additionally, the operating system usually includes numerous utility programs that are to be used only by an "administrator".

As used in this document, an "administrator" is a user or organization with current authority to perform system administrative functions such as maintaining and updating the operating system, whereas an "ordinary user" is a person who currently lacks such authority. Note that the same person could at some times be an administrator and at some times be an ordinary user. For example, a person may be an administrator when logged in with one login name and password, and an ordinary user when logged in with a different login name and password. In different systems, various procedures are used by administrators and ordinary users to take on their respective roles.

The operating system utilities may be distinct from the application programs. Although the dividing line between the two can be somewhat fuzzy, an operating system utility generally is distributed as part of an operating system, and maintains and supports the functions of the operating system. Also, an operating system utility may require special privileges (only possessed by the administrator) to perform its function. An application program, on the other hand, is a program that is designed to address a specific problem domain and that "uses" the services provided by the operating system.

A single program can be both an operating system utility and an application program, depending on how it is used. When executed by an administrator and with the privileges to perform its intended function, it is an operating system program. When executed by an ordinary user with no special privilege, it is an application program.

Most multi-user computer systems provide some discretionary security controls. Additionally, a number of computer systems provide mandatory controls and a set of features that facilitate the administration of computer security policies. The Trusted Computer Security Evaluation Criteria (TCSEC) is a National Computer Security Center (NCSC) standard for evaluating computers that provide security features. The TCSEC, also known as the "Orange Book", is fully described in the National Computer Security Center, *Department of Defense Trusted Computer System Evaluation Criteria*, DoD 5200.28-STD, Dec. 1985. The TCSEC has been used to evaluate numerous computer systems, including Multics, SCOMP, and Trusted XENIX.

Computer systems that provide access controls also must provide privileges that allow the controls to be overridden for system maintenance, software installation, etcetera. In the Unix operating system, for example, every process has an identifier that indicates the user for which the process is running. (Unix is a registered trademark of Unix System Laboratories, Inc. Different versions of Unix are commercially available from a number of sources.) Many Unix access controls are relaxed for a process running as the administrator (also called the root user). In other operating systems, such as VAX VMS, privilege is also associated with processes. (VAX VMS is a product of Digital Equipment Corporation.)

Although computer systems found to be trusted according to the TCSEC provide strong controls over the use of privilege, such systems are prohibitively expensive for many applications.

Most conventional operating systems (including Unix) control privilege using only discretionary access controls. Controlling privilege using discretionary access controls is a serious deficiency in conventional systems because discretionary controls do not provide high assurance that ordinary users cannot obtain inappropriate privileges and then use those privileges to modify the operating system or the applications. A typical example of a potential circumvention of discretionary access controls occurs when the password of a privileged user is observed. This is not an unusual occurrence, as passwords are notoriously difficult to keep secret. This deficiency is a particular concern for computer systems that are exposed to network-based attacks, because an intruder can obtain total control over a remote system.

Conventional mandatory and discretionary security controls assume an operating environment where ordinary users and application programs are potentially malicious. In such an environment, it is the responsibility of the computer system (and its administrators) to ensure that malicious programs or ordinary users cannot disrupt organizational goals. Conventionally, the computer system and administrators focus primarily on protecting data that is stored or processed on the computer system, and on protecting the continuous availability of the computer system.

Because conventional security controls make this assumption, they do not adequately support policies that prohibit execution of certain programs or algorithms. Execution control policies could provide significant benefits both for improved utilization of computer resources and data protection. For instance, execution control can prevent the execution of programs that might misuse computing resources. Furthermore, execution control can prevent the execution of programs that might attack the traditional mandatory and discretionary controls.

Certain execution control policies can be implemented through suitable configuration of mandatory and discretionary access controls of a conventional system. On some conventional systems, the administrator can configure the discretionary controls to prevent ordinary users from executing any but a preselected set of programs. For example, a Unix system can be configured to allow ordinary users to execute only a specified set of application programs. One way to accomplish this is where the administrator removes execute access from all programs except for those in the specified set, and then removes write and read discretionary access from these programs. Such an execution control policy is not practical, however, because almost all useful systems require applications (e.g., text editors) that allow ordinary users to create arbitrary files. Once files are created, it is possible (under Unix and under most operating systems) to execute them as new programs.

Some operating systems allow any file to be executed (e.g., MS-DOS). Others, including Unix, however, require that files be designated as "executable" before an ordinary user can execute them. Using this feature, it would appear that execution control could be achieved by making small changes to an operating system to prevent ordinary users (other than the root ordinary user) from ever adding execute status to a file. With this modification, however, the strength of the execution control would depend on the proper use of the root user id. That is, the strength would depend on the discretionary controls that are available to the root user. As discussed above, discretionary controls are vulnerable to Trojan Horse attacks.

A typical Trojan Horse attack in a Unix system involves an unauthorized ordinary user gaining root access. Numerous Unix processes usually run with the root id. Using a discretionary control based solution would make execution controls dependent on the correctness of all of those programs. Installing new versions of programs that run with the root privilege is a typical system administrative task. The introduction of any corrupted program would render the execution controls ineffective for the entire system. The execution control policies available with conventional operating systems thus do not adequately assure system security.

Often, a malicious ordinary user (called an attacker) relies on the ability to create and execute malicious programs on the target computer system. A first technique the attacker often uses is to create a Trojan Horse program that performs an apparently useful function and then saves the access rights of its ordinary user. Once a "victim" ordinary user runs the program, his access rights are saved in the form of a new executable program that runs with the victim's attributes when executed by the attacker. A second technique the attacker may use is to take advantage of errors in access controls or other system services so as to enable him to manipulate the operating system to his advantage. Often, these errors can only be exploited by writing a Trojan Horse program. A system with a strong mechanism for controlling execution could prevent the attacker from creating and executing programs, and could therefore prevent penetration by these two common techniques.

A related deficiency in the conventional art is that, once an attacker has penetrated a system, he can often "erase his footprints" by altering system logs that might reveal the attack. The privileges that enabled the attacker to penetrate the system commonly enable him to modify such logs.

The deficiencies in the conventional techniques for controlling how computers are used indicate that what is needed is a computer system which enables an administrator to reliably control what application programs are executed, and which provides the administrator with a reliable audit trail of how it has been used.

Computer Viruses

Another vulnerability of conventional computer systems is infection by computer viruses. A computer virus is a program that replicates itself by inserting copies of itself (or some derivation of itself) into existing programs. A program is said to be infected when it has been so modified. When an infected program is run, it executes the viral code that usually attempts to infect more programs.

In addition to propagating, virus programs may perform other functions. Although these functions may be beneficial, virus programs are generally malicious and take advantage of their stealth to alter program behavior in undesirable ways without the knowledge of ordinary users.

To reduce the chance of detection, a virus usually attempts to avoid infecting programs multiple times (which would increase the program size without bound). To avoid multiple infections, viruses typically add a "virus signature" to infected programs. Before infecting a program, a virus checks for its signature to determine if the program is already infected.

Virus countermeasures fall into two groups: infection prevention and infection detection (and removal). Most anti-virus products (e.g., Norton Antivirus, available from Norton Utilities, Inc. and Flu-shot, available from Semantec, Inc.) perform virus detection by scanning executable files for particular virus signatures and by computing checksums. Other detection methods are presented in M. M. King, "Identifying and Controlling Undesirable Program Behaviors," Proceedings of the 14th National Computer Security Conference, Oct. 1-4, 1991, Washington D.C. pp. 283-294; as well as in R. Davis, "Peeling the Viral Onion," Proceedings of the 14th National Computer Security Conference, Oct. 1-4, 1991, Washington D.C. pp. 417-426. There are no reliable software-based forms of virus prevention. Two serious deficiencies of current anti-virus techniques are thus that virus code may execute before a virus is detected, and that viruses whose signatures or behaviors are not known to the detection program may not be detected.

Typically, virus propagation is slowed but not completely impeded by discretionary controls. The reason is that viruses take on the discretionary abilities of the ordinary users that (unknowingly) execute the virus programs. (A virus can be viewed as a special kind of Trojan Horse program.) When a privileged user executes a virus-infected program, other programs may become vulnerable.

A possible approach to controlling virus propagation is to prevent insertion to, modification to, or removal of an approved set of executable programs. Such an approach would not prevent all kinds of viruses. For instance, some viruses are in programs that are not directly executed by a machine's CPU, but are instead "interpreted" by a directly executable program. Such viruses are "data" as far as the computer operating system is concerned, and it is not currently feasible to identify the kinds of data that might be interpreted as programs by other programs. Some conventional computer systems attempt to prevent virus attacks by storing executable programs in files and protecting the files from unauthorized reading, writing, creation or deletion using discretionary access controls. As has been noted above, discretionary access controls do not provide strong protection, and therefore do not adequately control the spread and other damaging effects of viruses.

The deficiencies of the conventional techniques for controlling viruses indicate that what is needed is a computer system which prevents the infection of computer systems and the spread of viruses.

SUMMARY OF THE INVENTION

The present invention addresses the deficiencies of the conventional computer systems described above by providing restrictions which cannot be changed by any application program or ordinary user, regardless of the privileges or attributes given to the application program or ordinary user by the underlying operating system. These restrictions enable modification of the operating system kernel and of any selected operating system programs, application programs, and/or data to be limited to an administrator.

The administrator designates the restrictions for programs and data through a trusted path mechanism (TPM). The TPM provides a reliable communication channel between the administrator and the underlying operating system. Use of the TPM assures the administrator that his administrative actions are not intercepted or modified by malicious application programs, and assures the underlying operating system that administrative actions are issued only by the administrator.

There is an inherent tradeoff in computer systems between the desired levels of security, flexibility and cost. The levels of these three factors are varied in three embodiments of the invention. The preferred embodiment for a particular use depends on the trustworthiness of the ordinary users, the resources that may be available to potential attackers, the threats to which the system will be exposed, and the intended applications to be run on the system.

A first embodiment, called a High Integrity (HI) system, provides protection from system penetrations and from either malicious or unintentional modifications of the underlying operating system. It provides protection of any number of selected application programs and selected data. The selected application programs are referred to as approved applications and the selected data are referred to as approved data. An example of the selected data is a Unix file. A collection of zero or more approved applications is referred to as an approved application set, and a collection of zero or more approved data is referred to as an approved data set. The operating system, the approved applications and the approved data are stored on a protected media (PM) to which the ordinary user and application programs cannot write.

The HI system enables the administrator to write to the PM. The administrator can therefore maintain and upgrade the operating system and can specify the approved applications and data. The HI system uses a Trusted Path Mechanism CYPM) to positively identify the administrator, and can therefore reliably limit PM write permission to him. The PM may not be the only media available to an HI system. Additional, unprotected media are designated user media (UM). A UM may hold user programs and data that users can modify without using a TPM.

The HI system assures the integrity of the operating system, the approved applications and the approved data while still enabling the ordinary user to create and execute application programs and to modify application programs and data which are not on the protected media. The HI system can therefore be used to protect certain critical applications and data without compromising system flexibility for non-critical applications and data.

A second embodiment is an Assured Audit (AA) system which collects audit information about the activities of ordinary users and application programs. As with the HI embodiment, the AA system employs a TPM and a PM. Using the TPM, the administrator specifies the nature of the audits by specifying audit configuration data. The AA system collects audit information as specified by the configuration data and generates audit logs from the information. Both the configuration data and the audit logs are stored on the PM. Therefore, application programs and ordinary users (other than the administrator) are prevented from disabling the auditing specified by the administrator and from erasing or modifying the audit data collected.

The AA system thereby enables the administrator to accurately monitor system uses, to the extent he desires. The AA system provides a high level of flexibility, as it permits ordinary users to create, modify and execute application programs which do not interfere with the auditing.

A third embodiment, referred to as a Controlled Execution (CE) system, has all of the elements and functions of the HI system, plus an additional feature. The CE system prevents ordinary users and application programs from executing any application program which is not an approved application program.

The various embodiments of the invention provide the following benefits:

HI System:
  Provides protection to both the operating system and selected application programs and/or data from changes introduced by system break-ins or malicious application programs.
  Prevents object code virus propagation for the set of approved applications. Unlike most countermeasures that detect the spread of viruses, the HI system can actually prevent them from spreading to the approved application set.
  Makes system penetration more difficult. Penetrations which involve modifying an operating system component will not succeed.
  Controls Trojan Horse programs. As long as users employ only approved applications, they can be sure that the programs have been installed by the administrator.

AA system:
  Permits administrators to keep track of system breakins, even when those breakins gain privileged access with respect to the underlying operating system. This functionality is particularly beneficial to systems that are on networks (such as the Internet) and subjected to continuous attack.

CE System:
  Provides execution control for computer systems that are intended to run only a specified set of applications. Execution control reduces the possibility of data loss and system malfunction by preventing execution of programs that could impede security.
  Prevents object code virus propagation. Unlike most countermeasures that detect the spread of viruses, CE systems can actually prevent their spread.
  Controls Trojan Horse programs. Ordinary users can be sure that their programs have been installed by the administrator.
  Makes system penetration more difficult. Penetrations that involve tricking a program into creating a modified version of itself, or into running the penetrators program, will not succeed. For instance, the Internet worm (discussed in E. H. Spafford, "The Internet Worm: Crisis and Aftermath," Communications of the ACM, Vol. 32, Number 6, Jun. 1989, pp. 678–688) would not have spread to CE systems.

A benefit inherent in all of the embodiments of the present invention is its broad applicability. The HI, CE and AA systems can be built using any underlying operating system that has at least two protection states that generally prevents application programs and ordinary users from normally modifying the operating system. This makes the invention relatively generic to operating systems.

DETAILED DESCRIPTION OF THE PREFERRED EMBODIMENTS

Table of Contents

High Integrity System
  Overview
  Protected Media
  Trusted Path Mechanism
  Initialization
  Protection of the HI System
Assured Audit System
  Overview
  Auditing
Controlled Execution System
Conclusion High Integrity System Overview The present invention is implemented with a conventional operating system (referred to as an underlying operating system) and conventional hardware (referred to as underlying hardware). Modifications necessary to the underlying hardware and software will be explained in this document. The present invention is a system and method which provides a reliable restriction policy on the usage of a computer system. This policy cannot be changed by application programs or ordinary users, regardless of any underlying operating system based privileges or attributes associated with the program or user.

A first embodiment of the present invention, referred to as a high integrity (HI) system, provides security by enabling modification of the operating system and any selected operating system programs, application programs and data to be limited to an administrator. It does so without substantially compromising system flexibility, as the restriction policy does not prevent an ordinary user from creating application programs or data or from modifying existing application programs and data which are not designated for protection. The HI system can therefore be used to protect certain critical applications and data without compromising system flexibility for non-critical applications and data.

The HI system has two modes of operation: a trusted path mode and a general purpose mode (GPM). The underlying operating system and application programs can only be modified in the trusted path mode. The trusted path mode is only accessible by the administrator. Although the administrator must know how to use the unique features of the HI system, the HI system can be configured to behave identically to the underlying operating system for ordinary users.

Figure 1:
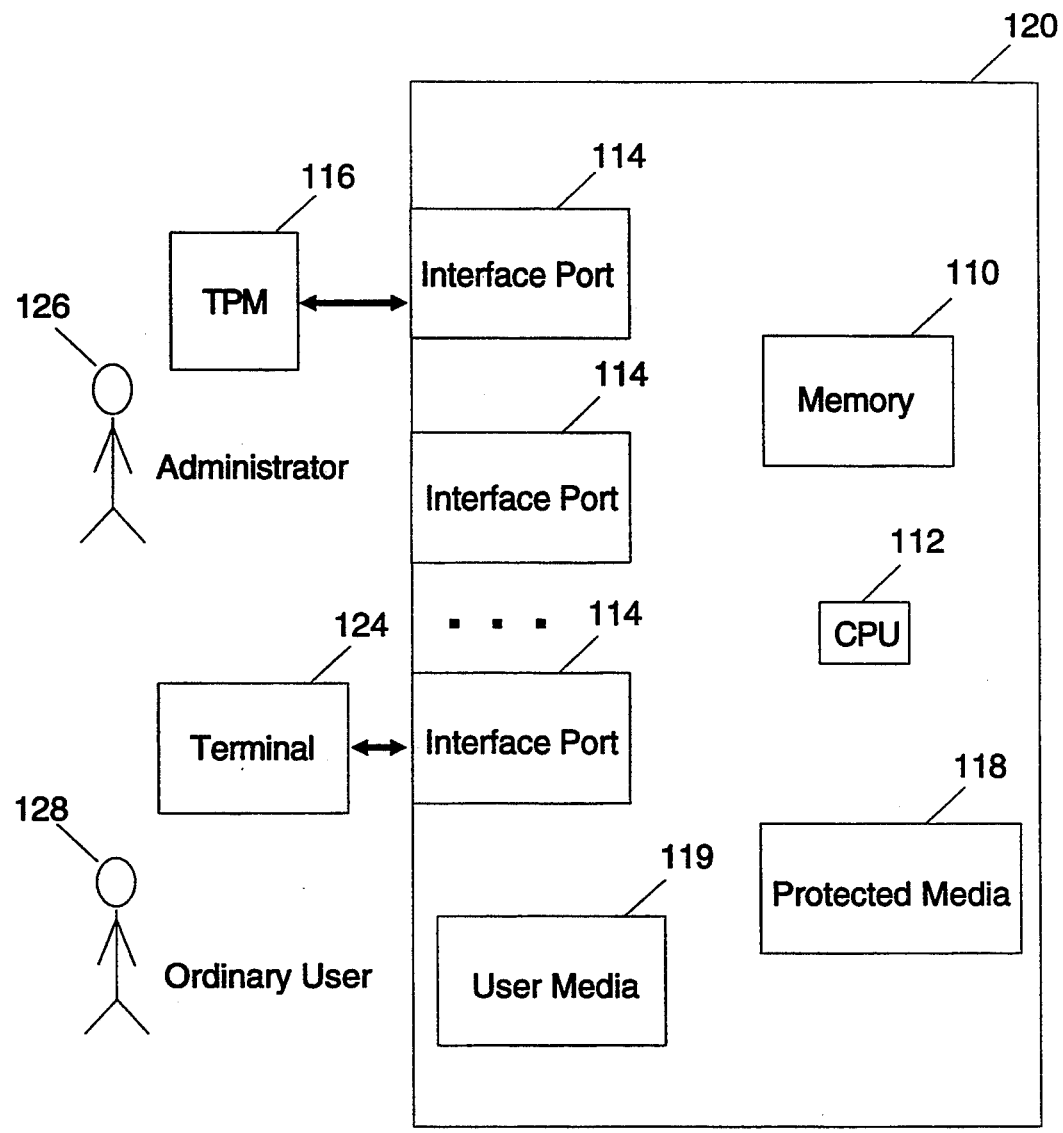
FIG. 1 shows a block diagram of the high integrity (HI) system in which a protected media and a user media are internal to the system cabinet.

FIG. 1 shows the structure of the HI embodiment. In the context of the HI embodiment, this structure will be referred to as an HI system 100. The HI system 100 includes a system cabinet 120 which encloses a memory 110, a central processing unit (CPU) 112, a number of interface ports 114, a protected media (PM) 118, and a user media (UM) 119. The interface ports 114 are physical connections to a system cabinet 120 of the HI system 100 which allow peripheral devices such as keyboards, monitors, network connectors and disk drives to be connected to a system cabinet 120.

The PM 118 stores the operating system, operating system swap space, and any additional programs and data sought to be protected. The section entitled "Protected Media" describes the PM 118 in greater detail. The UM 119 stores user programs and data. The UM 119 could be a conventional storage device, such as a disk drive. The UM 119 presents no security risk because the operating system 216 does not depend on anything stored on any media other than the PM 118. The UM 119 and the PM 118 could be implemented on the same physical storage device.

Figure 3:
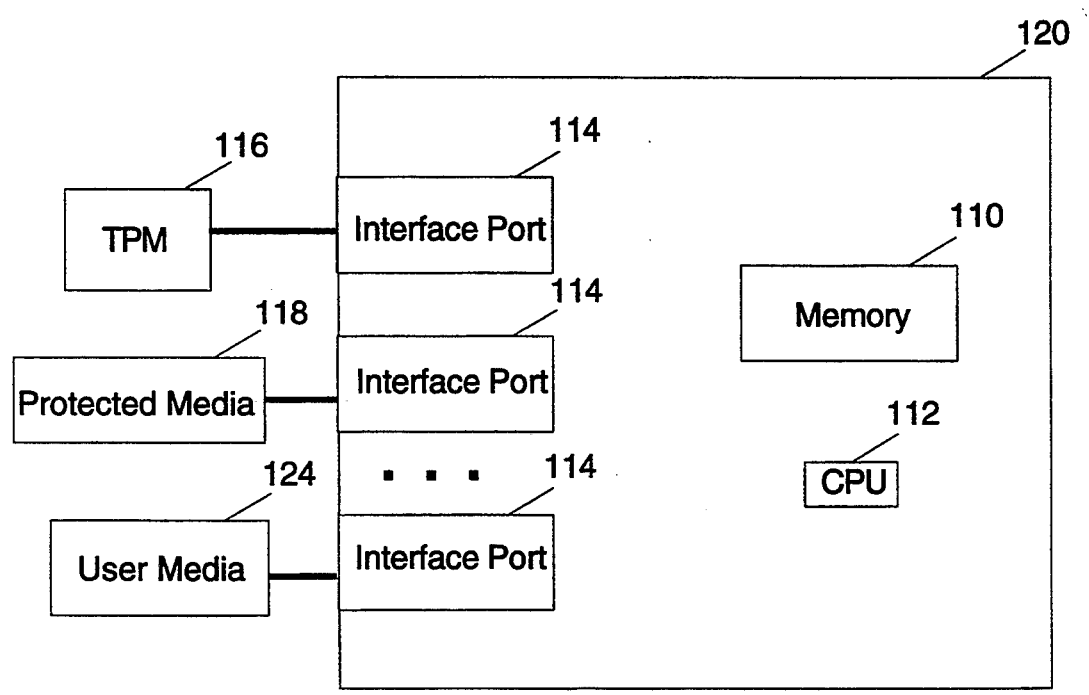
FIG. 3 shows a block diagram of the HI system in which a protected media and user media are external to the system cabinet.

Although FIG. 1 depicts the PM 118 and the UM 119 within the system cabinet 120, either or both could be outside the system cabinet 120 and connected to the interface ports 114. FIG. 3 shows a high level block diagram of the HI system 100 in which the PM 118 and UM 119 are external to the system cabinet 120. In FIG. 3, the PM 118 and the UM 119 are connected to interface ports 114. Such a configuration does not reduce the integrity of the PM 118, as it is assumed that an administrator 126 provides adequate physical security of the PM 118 and the system hardware.

In FIGS. 1 and 3, a trusted path mechanism (TPM) 116 is shown connected to one of the interface ports 114. The TPM 116 is used by the administrator 126 to modify what is stored on the PM 118, and is described below in the section entitled "Trusted Path Mechanism".

In FIG. 1, the terminal 124 is connected to one of the interface ports 114. The administrator 126 is shown interacting with the CE system 100 through the TPM 116, and an ordinary user 128 is shown interacting with the CE system 100 through the terminal 124.

Protected Media

The PM 118 is a storage media having three parts:
1) a read/write part that is modifiable only through the TPM 116 and holds the operating system (referred to as an operating system portion);
2) a read/write pan that may be used by the operating system for its interdal purposes (e.g., paging and swapping) and is not directly modifiable by ordinary users or application programs (referred to as a swap/page portion); and
3) a read/write part that is modifiable only through the TPM 116 and that holds approved application programs and data (referred to as the application/data portion).

Trusted path commands allow the administrator to modify the operating system portion and the application/data portion of the protected media. Modifying the operating system portion means maintaining or updating the operating system. Modifying the application/data portion means adding, changing or deleting applications and/or data stored in that portion.

The protection mechanism of the PM 118 could be implemented with, for example, some combination of: 1) access controls present in the underlying operating system (such as mounting a file system read-only or limiting direct access to the contents of the PM 118 to the operating system); 2) cryptography; or 3) physically deterring the ordinary user from physically tampering with the computer system, in conjunction with a storage device such as a conventional disk or a random access memory. Also, the operating system portion and/or the application/data portion could be implemented with a write once, read many (WORM) storage device.

Figure 2:
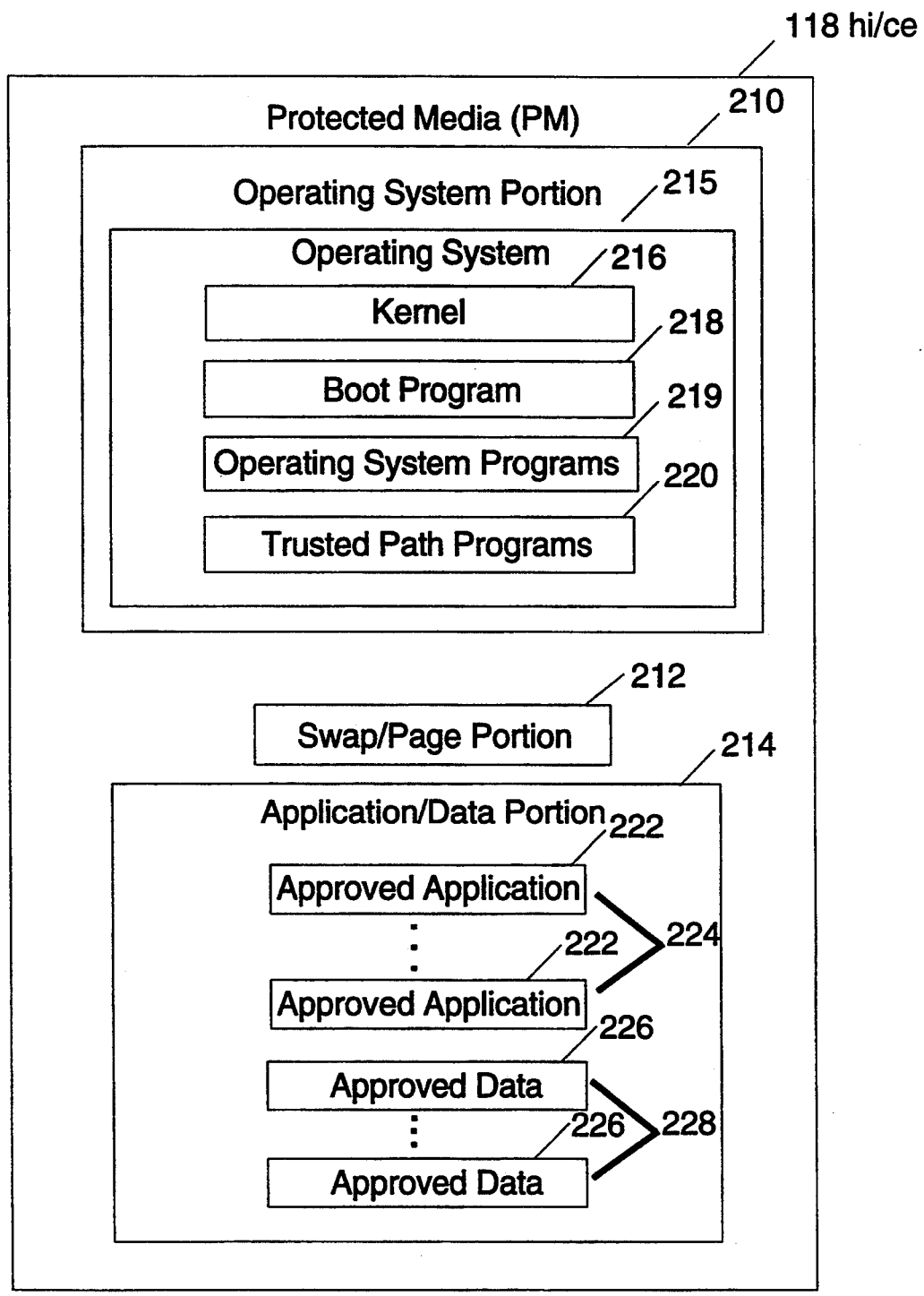
FIG. 2 shows a block diagram of the protected media of the HI system and of the CE system.

FIG. 2 shows the structure of a PM 118hi of the HI system 100. Looking at FIG. 2, the first part of the PM 118hi, referred to as an operating system portion 210, holds the operating system 215. The operating system 215 manages all physical resources, including all components inside the system cabinet 120 and, via the interface ports 114, all components outside the system cabinet 120. The operating system 215 is comprised of a kernel 216, a boot program 218, operating system programs 219 and trusted path programs 220. The kernel 216 is the portion of the operating system 215 which is always present in the memory 110 of the HI system 100. The kernel 216 is further described above in the section entitled "Related An". The boot program 218 instructs the HI system 100 during system initialization, as explained below in the section entitled "Initialization". The operating system programs 219 are the programs which perform operating system 215 tasks but which are not in the kernel 216. The trusted path programs 220 which implement the trusted path commands discussed above in this section. As stated above, the contents of the operating system portion 210 cannot be modified by the ordinary user 128. As used in this document, "modify" includes insertion and deletion.

The second part of the PM 118hi, referred to as a swap/page portion 2 12, stores pages which have been swapped out of the memory 110.

The third part of the PM 118hi, referred to as an application/data portion 214, holds the application programs and data sought to be protected. Such application programs are referred to as approved applications 222, while such data are referred to as approved data 226. The approved applications 222 are collectively referred to as an approved application set 224. The approved data 226 are collectively referred to as an approved data set 228.

Trusted Path Mechanism

The HI system 100 employs the TPM 116 to enable the administrator 126 to specify the approved application set 224 and the approved data set 228 and to prevent the ordinary user 128 from doing so. The role of the TPM 116 is to enable the HI system 100 to reliably distinguish the administrator 126 from application programs or the ordinary user 128. Specifically, the TPM 116 establishes a reliable connection between the administrator 126 and the HI system 100. While this connection is established, the HI system 100 is said to be operating in a trusted path mode. Operation of the HI system 100 in which the connection is not established is referred to as general purpose mode.

An essential requirement of the trusted path mode is that it must be impossible for any application program to interfere with the dialogue between the administrator 126 and the HI system 100. This requirement implies that the trusted path mode can only be established through explicit action by the administrator 126, and in particular, that the trusted path mode cannot be established by any program. Trusted path programs are only available while in trusted path mode.

If the trusted path mode were established by a normal program, the HI system 100 could not have confidence in the identity of the administrator 126, and vice versa. For example, a trusted path program could be executed by a malicious application program, in which case the HI system 100 would take configuration directions from an entity that is not the administrator 126. Alternatively, a malicious application program could masquerade as a trusted path program and modify the commands of the administrator 126 before passing them on to a genuine trusted path program. In either case, an entity other than the administrator 126 would control system configuration.

Implementation of the TPM 116 depends on implementation details of the underlying operating system. It may be desirable for the TPM 116 to be usable during normal system operation, e.g., from any terminal 124 and without re-booting. Such a TPM 116 would need to guard against possible attacks by malicious application programs and ordinary users 128. A typical approach to guarding against such attacks is for the TPM 116 to intercept all keystrokes and, upon detecting a specified sequence of keystrokes, to take over the terminal 124 from which the sequence was typed, thereby excluding other programs. U.S. Pat. No. 4,918,653 to Johri et al. discloses an example of such a TPM 116.

Implementation of the TPM 116 is substantially less complex if the trusted path mode is restricted to a special mode of the operating system 215 in which no ordinary user can be logged in, and in which no normal program can be running. As an example, in an HI system 100 in which Unix is the underlying operating system, the TPM 116 could be implemented using the Unix single user mode in conjunction with the operating system programs 219 to administer the system. This section describes a trusted path mechanism that is based on the Unix single user mode.

Throughout this document, Unix is used as an exemplary underlying operating system. However, the invention could be used with a variety of operating systems. General Unix concepts are described in *The Design and Implementation of the 4.3 BSD Unix Operating System*, S. J. Leffier, et. al. 1989 by Addison-Wesley.

Upon booting a Unix system, an operator at a terminal established (generally by the underlying hardware) to be the console 122 can bring the system into the single user mode. In the single user mode, the system only receives input from the console 122. Other terminals 124 am not served by the system processes that log in ordinary users 128. Furthermore, in the single user mode, application programs other than those invoked from the console 122 are precluded from running. Accordingly, the administrator 126 can be sure that the only programs running are the kernel 216 and operating system programs 219 and any programs he has explicitly invoked. Therefore, as long as he only invokes the approved applications 222 (which are "trusted"), a trusted path exists between the administrator 126 and the operating system 215.

Initialization

Figure 4B:
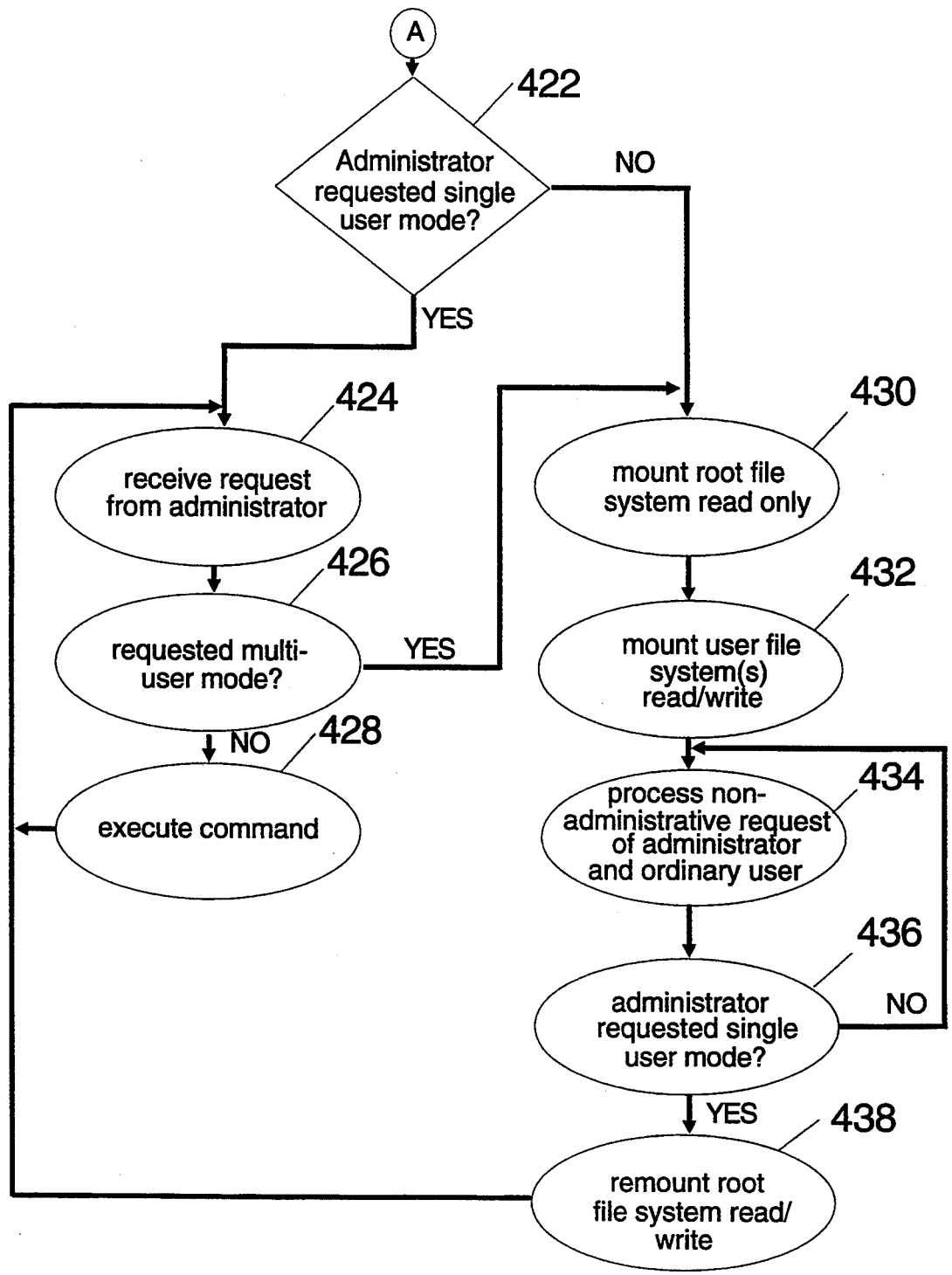
FIGS. 4A and 4B show a flowchart of the method of initialization of the HI system.
Figure 4A:
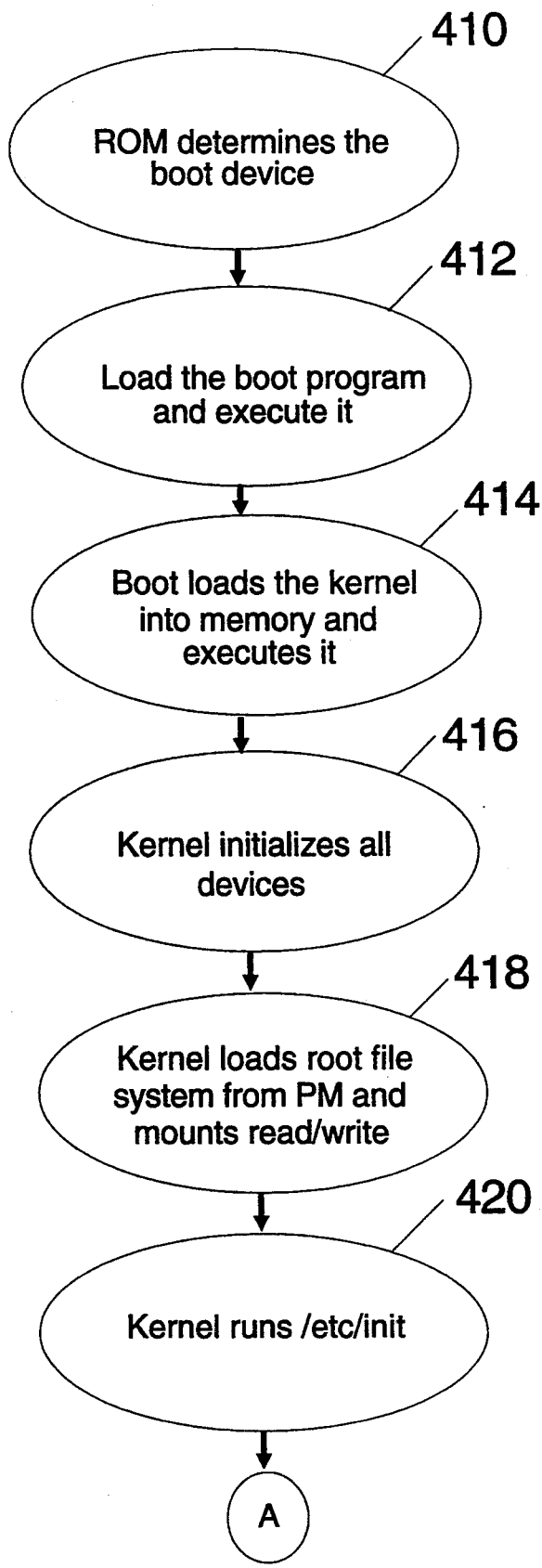

FIG. 4A shows the steps taken to initialize an implementation of the HI system 100 in which Unix is the underlying operating system. The initialization sequence is a modified version of the conventional Unix initialization. When power is supplied (or the reset button is pressed), the underlying hardware determines the location of a boot program 218. (See step 410.) The location is generally stored in a read-only memory (ROM) device of the underlying hardware.

Next, the hardware loads the boot program 218 from the PM 118hi and executes it. (See step 412.) Execution of the boot program 218 loads the kernel 216 from the PM 118hi into the memory 110 and causes the underlying hardware to execute it. (See step 414.) The boot program 218 is a "stand-alone" program in that it executes on the underlying hardware without operating system support. Accordingly, to enable it to load the kernel 216, the boot program 218 includes special device drivers for reading from the PM 118hi.

The kernel 216 then enters its initialization sequence, in which it initializes all physical devices, CPU address translation and kernel data structures (See step 416.) The kernel 216 then loads and mounts the root file system read/write (i.e. so that it can be read from and written to). (See step 418).

After the kernel 216 has mounted the root file system, it executes the/etc/init program, which is responsible for user-level initialization. (See step 420.) The administrator 126 then has the option of directing (from the console 122)/etc/init to bring the HI system 100 into single-user mode and thereby establish the trusted path mode. (See steps 422 and 424 of FIG. 4b.) The ROMs in the underlying hardware of the HI system 100 restrict invocation of this option to the console 122.

If the HI system 100 received a request by the administrator 126 to enter single user mode (see step 422), it then receives further commands from the administrator 126 (see step 424). The HI system 100 continually processes the commands until receiving a request to enter multi-user (i.e., general purpose mode) node. (See steps 426 and 428.) These commands would likely involve invoking the trusted path programs 220 to maintain or update the operating system 215 or to modify the approved application set 224 or the approved data set 228.

If the administrator 126 did not request to enter single user mode, or once the administrator 126 requests to enter multi-user mode, the HI system 100 mounts the root file system as read only. (See step 430.) Using Unix as an example, the underlying operating system will prevent application programs and ordinary users from writing to ordinary files or directories on a file system which is mounted read-only. The handling of device special files (which may still be modified) is described below in the section "Protection of the HI System ". The HI system 100 is implemented so that even an ordinary user 128 with root privileges cannot write to the root file system, although the administrator 126 can do so using the TPM 116.

The HI system 100 then mounts the user file system or file systems as read/write, thereby enabling the ordinary user 128 to write to the UM 119. (See step 432.) Once it has carried out this step, the HI system 100 is in multi-user mode. Accordingly, it then spawns a getty process on each terminal 124. Each getty process then reads the login name of the ordinary user 128 of that terminal and runs the login program, which reads the password of the ordinary user 128 and performs final authentication before giving the ordinary user 128 a login shell. Once logged in, the ordinary user 128 can issue commands to the HI system 100. The HI system 100 continually processes the requests of the administrator 126 and the ordinary user 128 until detecting a request from the administrator 126 to enter single user mode (e.g. a request to reboot the system which is issued at the console). (See steps 434 and 436.)

If it receives a request from the administrator 126 to enter single user mode from multi-user mode, the HI system 100 must re-mount the root file system as read/write to enable it to be written to. (See step 438.) Once the root file system has been mounted read/write, the HI system 100 is in single user mode. The behavior of the system is then as described above. (See steps 424–428.)

Protection of the HI System

The HI system 100 assures the integrity of the PM 118hi by capturing all application program requests and ordinary user requests and refusing those that would modify programs or data on the PM 118hi. On the other hand, the underlying operating system must be able to write to the swap/page portion 212. Therefore, the HI system 100 must be able to distinguish application program and ordinary user requests from operating system requests. The latter must be able to write to the PM 118hi for the system to function.

Figure 5:
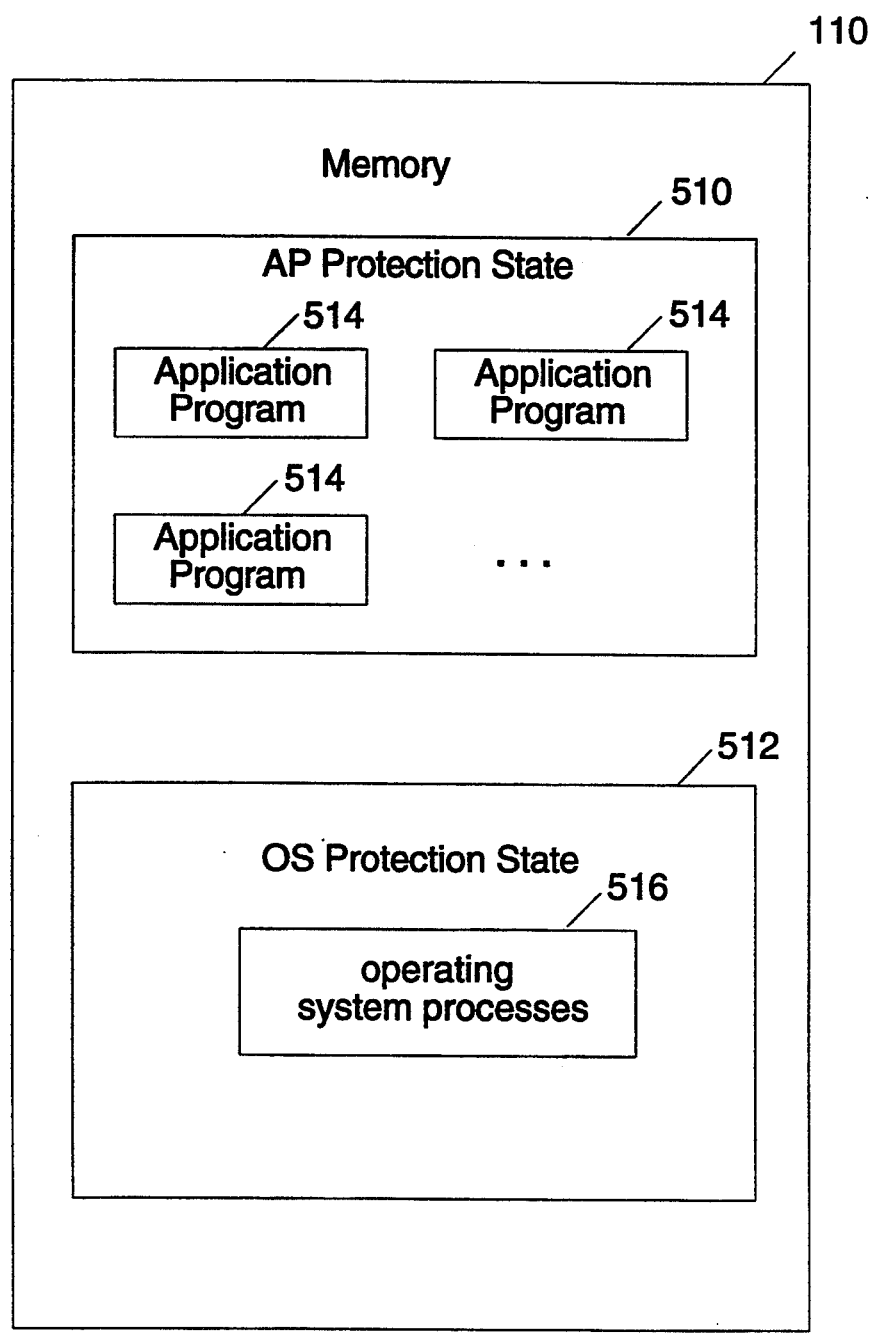
FIG. 5 depicts the two protection states of an underlying operating system of FIG. 1.

FIG. 5 shows a block diagram of the memory 110 of the HI system 100, which is divided into an application protection state 510 and an operating system protection state 512. Application programs 514, including those in the approved application set 224, are run in the application protection state 5 10. Operating system processes 516, which include the kernel 216, the operating system programs 219 and the trusted path programs 220, are run in the operating system protection state 512.

Figure 6:
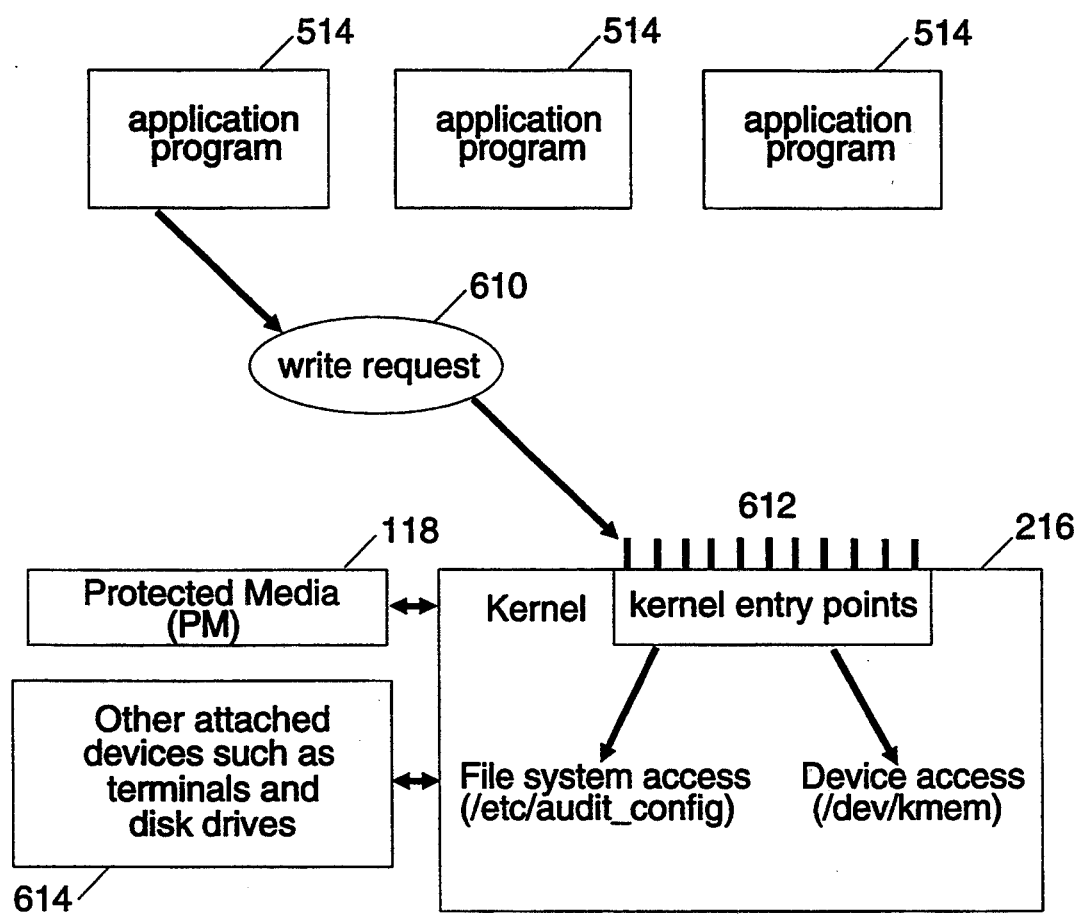
FIG. 6 depicts the kernel-provided access points (to memory and to devices) of the underlying operating system.

The protection scheme is further illustrated by FIG. 6, which shows a block diagram of the relationship between the kernel 216, the application programs 514, and the PM 118hi. The HI system 100 forces every memory access request (shown as a write request 610) from any of the application programs 5 14 to enter the OS protection state 512 at one of the well-defined kernel entry points 612. In other words, memory access requests must be made with a system call to the kernel 216. This restriction enables the kernel 216 to examine the request and refuse it if it would involve inappropriate writing to the PM 118hi.

The approved applications 222, the approved data 226, and the operating system 215 are visible to the application programs 514 as files that reside on the PM 118hi. There are essentially three ways that an application program 514 or the ordinary user 128 could potentially modify these files. These are as follows.

First, the application program 5 14 or ordinary user 128 could potentially do so through direct memory modifications. This would require the application program 514 finding a "hole" in the memory protection scheme of the operating system 215. An example of a hole is a system call that, when provided with faulty arguments, writes unintended values into the address space of the kernel 216. In the HI system 100, the kernel 216 is analyzed and tested to reduce the risk of this kind of attack. Because the application programs 514 and the operating system processes 516 execute in different protection states, this kind of attack would have to exploit a fundamental (and thus improbable) error in the underlying operating system.

Second, the PM files could potentially be modified by file operations that attempt to write to the PM 118hi. The read-only status of the root file system (and any other file system on the PM 118hi) prevents any such modifications, even with the root privilege.

The third way the PM files could potentially be modified is through direct modification of the PM 118hi. In many operating systems (including Unix), devices are represented to the application programs 514 as device special files. A device special file allows the application program 514 to perform operations on (i.e., to read from and write to) the corresponding device as if it were a regular file. In particular, character devices in Unix are generally exempt from the read-only access controls set up by the HI system initialization. This exemption enables the ordinary user 128 to transmit keystrokes to the HI system 100 by "writing" to the character device that represents his terminal 124. The HI system 100 prevents any writing to character devices which represent the PM 118hi or the contents of the OS protection state 512. Specifically, it keeps track of the device major and minor numbers for the PM 118hi, and refuses all write requests from the application programs 514 to those devices unless made by a program running in single-user mode. An example in Unix is the special file /dev/kmem, which holds (as a file) the executing memory image of the kernel 216.

Protection of the integrity of the PM 118hi may require further modifications to the underlying operating system if the latter provides ways for one process to write into the address space of another, and if the proper functioning of the system depends on user-level processes (such as the init and pager processes in Unix). For example, in Unix, the ptrace system call enables one process to modify another. Therefore, if Unix were the underlying operating system, the ptrace facility would have to be modified to prevent its use on executing programs (including the kernel 216) which are stored on the PM 118hi. Additionally, any ROM monitor program that enables the ordinary user 128 to read from and write to the memory 110 must be disabled.

In order to gain assurance that the kernel 216 implements strong protection of itself, the underlying operating system source code is examined for Trojan Horse code. With the Unix operating system, there are many different versions sold by many different vendors. In many of the versions, however, much of the source code is identical. Accordingly, the examination can be performed by determining the source code file differences between the different versions and focusing on relatively recent source changes. Such a comparison is particularly valuable when it involves an operating system which is used in a computer system which satisfies the *Department of Defense Trusted Computer System Evaluation Criteria* (cited above). Assurance is increased by testing the kernel 216, including penetration testing.

Assured Audit System

Overview

A second embodiment of the present invention is similar to the HI system 100, but employs a slightly different PM 118 and has auditing capabilities. The second embodiment collects and makes available to the administrator 126 information about the activities of application programs 514 and/or ordinary users 128 of the underlying operating system. The nature of the auditing performed by the second embodiment is specified by the administrator 126. As with the HI system 100, the ordinary user-visible behavior of the second embodiment is almost identical to that of the underlying operating system. The second embodiment thus provides heightened security without compromising flexibility.

The auditing of the second embodiment is particularly characterized by two key features. First, the second embodiment audits activities of all application programs 514 and ordinary users 128, including those privileged with respect to the underlying operating system (e.g., those having Unix root privilege). Second, neither application programs 514 nor ordinary users 128 (even those privileged with respect to the underlying operating system) can affect the auditing or the storage of usage auditing in any way.

As with the HI system 100, the block diagram of FIG. 1 depicts the high level structure of the second embodiment. Accordingly, the second embodiment is referred to as an assured audit (AA) system 100.

Figure 7:
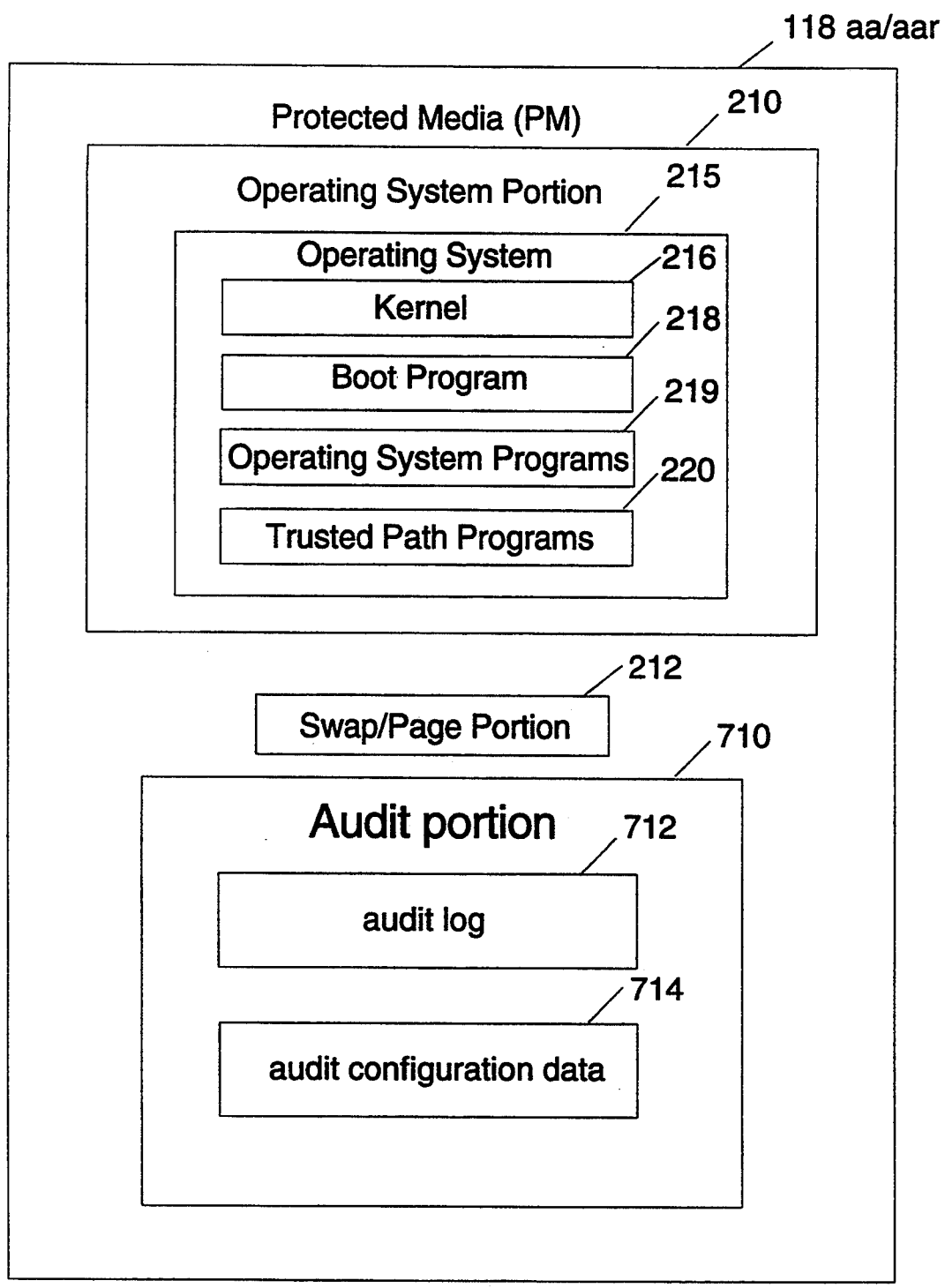
FIG. 7 shows a block diagram of a protected media of an assured audit (AA) system.

The AA system 100 and the HI system 100, however, employ different variations of the PM 118. FIG. 7 shows the structure of a PM 118aa of the AA system 100. As with the PM 118hi of FIG. 2, the PM 118aa has an operating system portion 210 and a swap/page portion 212. The PM 118aa additionally has an audit portion 710 which contains an audit log 712 and audit configuration data 714. The characteristics of the audit area 710 are the same as those of the application/data area 214 of the PM 118hi, i.e., it is modifiable only through the TPM 116. The audit log 712 and audit configuration data 714 are explained below in the section entitled "Auditing". The AA system 100 could be implemented with or without support for an approved data set 228 and an approved application set 224, i.e., with or without the application/data area 214 of the PM 118hi of the HI system 100 and their associated trusted path programs 220 (which are included as part of the operating system programs 219). Another distinction between the PM 118hi and the PM 118aa is that the trusted path programs 220 of the latter include programs to enable the administrator 126 to manipulate the audit logs 712 and the audit configuration data 714.

The TPM 116 in the AA system 100 is essentially as described above for the HI system 100.

Initialization of the AA system 100 is essentially as described above for the HI system 100. However, in the AA system 100, initialization includes starting the system auditing as described below in the section entitled "Auditing".

Auditing

During operation, the AA system 100 performs two types of auditing to collect two types of audit data (collectively referred to as user/system audit data). The first type of auditing, referred to as user activity auditing, tracks operating system requests made by ordinary users 126 and application programs 514. Examples of operating system requests are login attempts, file accesses and execution of programs under a privileged user identifier (e.g., Unix root). The data collected in user activity auditing is referred to as user activity data.

The second type of auditing, referred to as system status auditing, involves periodically capturing system activity information. System activity information includes, for example, statistics on the number of processes running, the average amount of cpu usage and swapping activity. The data collected in system status auditing is referred to as system status data.

Figure 8:
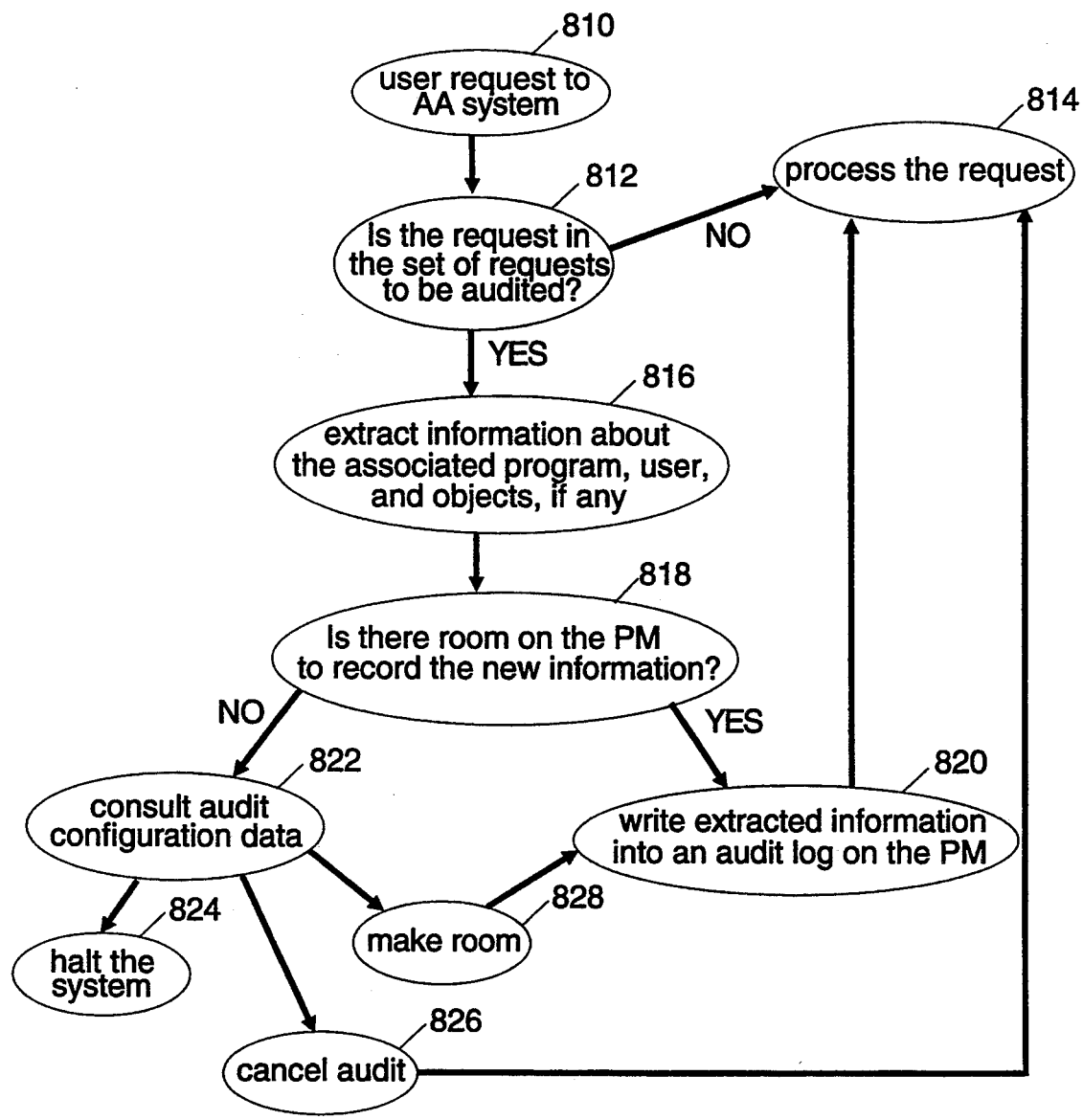
FIG. 8 shows a flowchart of the method of auditing of the AA system.

FIG. 8 is a flowchart which shows the essential steps of user activity auditing. First, the AA system 100 captures each request made to the operating system 215. (See step 810.) The AA system 100 consults the audit configuration data 714 to determine whether or not the request is in the set of requests to be audited. (See step 812.) The audit configuration data, which is specified by the administrator 126, may indicate which requests are to be audited depending upon, for example, the identity of the request, the intended use of the AA system 100, past audit results, whether the AA system 100 can be accessed via a network, any privilege with which the request is made, and the nature or identity of any "objects" accessed. (An object could be, for example, a file or a program.)

If the request should not be audited, the AA system 100 next processes the request, e.g., by invoking a system call. (See step 814.) Otherwise, the AA system 100 proceeds as follows. It extracts information about the ordinary user 128, the application program 512, and, if applicable, accessed objects. (See step 816.) The AA system 100 then determines whether there is room to write the extracted information (i.e., the user activity data) on the PM 118aa. (See step 818.) If so, the AA system 100 write the new audit log 712 to the PM 118aa (see step 820) and then processes the operating system request (see step 814).

If, on the other hand, there is not room on the PM 118aa for the user activity data, then the AA system 100 consults the audit configuration data 714 to determine what to do. (See step 822.) Depending on the audit configuration data 714, the AA system 100 may halt the system (see step 824), defer auditing (see step 826), or delete some preexisting audit data to make room (see step 828). If audit data was deleted (See step 828), then the AA system 100 next writes the new audit log 712 to the PM 118aa. (See step 820.) After carrying out the appropriate action, the AA system 100 processes the operating system request (unless the system was halted). (See step 814.)

The method of the AA system 100 in carrying out system status auditing is straightforward, as many conventional underlying operating systems can generate system status information. For example, the SunOS 4.1.1 version of Unix (available from Sun Microsystems, Inc., Mountain View, Calif.) can provide the following information for each process:

Accumulated CPU time in clock ticks
Accumulated real time in seconds
Accumulated time spent in kernel mode
Accumulated time spent in ordinary user mode
Start time
Utilization of real memory
Text, Data, and Stack sizes
Number of block input operations
Number of block output operations
Number of characters read/written
Number of disk I/Os as a result of page-ins
Number of involuntary context switches Number of messages received
Number of messages sent
Number of open files
Number of page faults not requiring I/O
Number of page faults requiring I/O
Number of signals received
Number of swaps
Number of voluntary context switches
Percent of real memory used
Priority (nice value)
Process ID of parent
Ordinary user ID
Group ID Effective analysis of system status audit data reveals much about the how a computer system is being used. Although the analysis of process status data is an area of research, there are conventional methods for identifying particular usage patterns that are likely to indicate unauthorized use. For example, a pattern in which many block input operations are followed by high utilization of the CPU 112 (as measured by context switches and the absence of paging behavior), followed by numerous block output operations could indicate a batch oriented application program making heavy use of the CPU 112. This pattern would be suspect if encountered in a computer system that was intended for interactive applications.

Controlled Execution System

A third embodiment of the present invention is essentially an HI system 100 that, in addition to assuring the integrity of the PM 118hi, enforces an execution control policy over all ordinary users 128 and application programs 514 of the underlying operating system. Specifically, the third embodiment restricts the execution of application programs 514 to those in the approved application set 224.

As with the HI system 100, the block diagram of FIG. 1 depicts the high level structure of the third embodiment. Accordingly, the third embodiment is referred to as a controlled execution (CE) system 100. The structure of the TPM 116 and the PM 118, as well as the method of the initialization of the CE system are essentially the same as those of the HI system 100.

The protection scheme of the CE system 100 is similar to that of the HI system 100. As with that system, the CE system 100 enforces the PM write restrictions characteristic of the underlying operating system of allowing access to memory only through system calls to the kernel 216. The CE system 100 enforces its execution control policy by relying on a similar characteristic of the underlying operating system: execution requests can only be made through system calls to the kernel 216. The CE system 100 can thereby intercept all requests to execute programs and refuse any which would involve executing a program which is not on the PM 118ce.

Implementation of the execution control policy is straightforward. In a CE system 100 in which Unix is the underlying operating system, implementation requires modifying the conventional "exec" system call to ensure that each program to execute resides on the PM 118ce.

Figure 9:
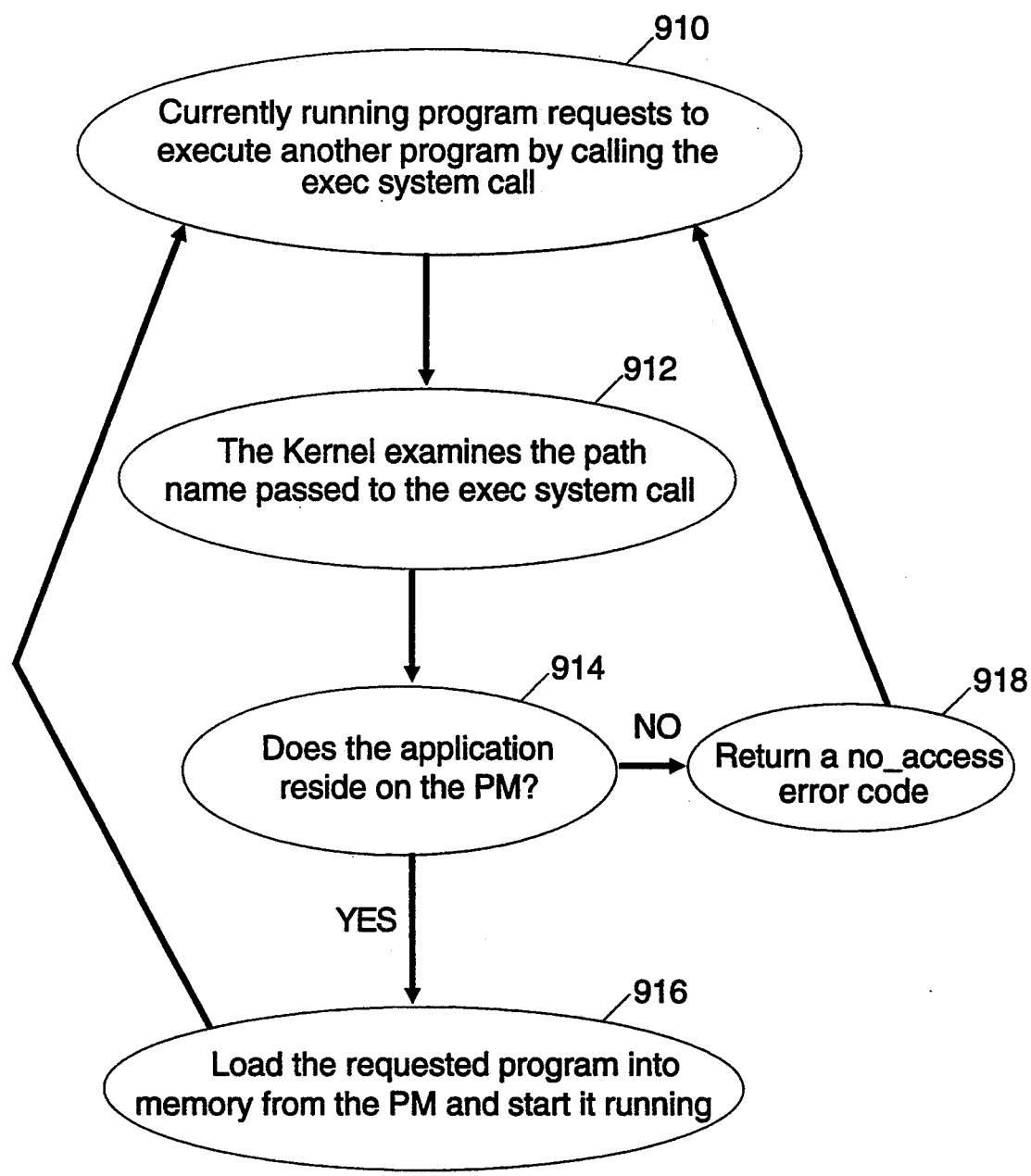
FIG. 9 shows a flowchart of the method of controlling execution of the CE system.

FIG. 9 is a high level flowchart of the method of the execution control enforcement. A currently executing program makes a request to the kernel 216 to execute another program. (See step 910.) Note that there is always a currently executing program. For example, when the ordinary user 128 logs into the CE system 100, the currently executing program is the shell program, i.e., the operating system program that interprets his commands.

The kernel 216 of the CE system 100 then checks the pathname (i.e., the logical location) of the requested program. (See step 912.) If the pathname indicates that the requested program resides on the PM 118ce, the CE system 100 loads the requested program from the PM 118ce into the memory 110 and executes it. (See steps 914 and 916.) Otherwise, the kernel 216 returns an error code to the requesting program to indicate that execution permission was denied. (See step 918.) After executing the requested program or returning the error code, the CE system 100 repeats the process as required.

Conclusion

While various embodiments of the present invention have been described above, it should be understood that they have been presented by way of example only. Thus, the breadth and scope of the present invention should not be limited by any of the above-described exemplary embodiments, but should be defined only in accordance with the following claims and their equivalents.

What is claimed is:

1. A computer-based method for controlling modification of an operating system and an approved application set of zero or more approved applications on a computer comprising a protected media, the protected media comprising a non-volatile storage device, the operating system and the approved application set being stored in the protected media, the method comprising the steps of:
   (1) loading the operating system from the protected media into a volatile memory of the computer and executing the operation system, the operating system having a trusted path mode and a general purpose mode;
   (2) establishing a reliable communication path between an administrator and the operating system by entering the trusted path mode of the operating system;
   (3) while said operating system is in said trusted path mode, carrying out a request by an administrator to modify the approved application set which resides on said protected media, wherein said operating system exits said trusted path mode and enters said general purpose mode upon detecting a request to do so by the administrator;
   (4) while said operating system is in said general purpose mode,
      (a) denying any request by an application program or an ordinary user to modify the approved application set which resides on said protected media; and
      (b) denying any request by said application program or said ordinary user to modify the operating system which resides on said protected media.

2. The method of claim 1, wherein step (2) comprises a step of carrying out a request to enter said trusted path mode, wherein said request is made by said administrator during system initialization.

3. The method of claim 1, further comprising a step of carrying out a request to enter said trusted path mode, wherein said request is made by said administrator in said general purpose mode of step (3).

4. The method of claim 1, further comprising a step of entering a single user mode of the operating system so as to enter said trusted path mode.

5. The method of claim 1, further comprising a step of carrying out a request to modify the operating system, wherein said request is made by said administrator in said trusted path mode.

6. The method of claim 1 in which said protected media also stores an approved data set of zero or more approved data, further comprising the steps of:
 carrying out a request to modify said approved data set which is stored in said protected media when said request is made by said administrator while the operating system is in said trusted path mode; and
 denying any request to modify said approved data set which is stored in said protected media when said request is made while the operating system is in said general purpose mode.

7. The method of claim 1, further comprising a step of carrying out a request by said application program or said ordinary user to modify user data.

8. The method of claim 1, further comprising a step of capturing and denying any request to modify a swap/page portion of said protected media, wherein said swap/page portion is used by the operating system for its internal purposes, and wherein said request is made by said ordinary user or said application program.

9. The method of claim 1, wherein step (1) comprises a step of mounting a file system corresponding to a portion of said protected media which stores an approved data set of zero or more data, wherein said file system is mounted so that its contents cannot be modified by said application programs or said ordinary users.

10. The method of claim 1, wherein step (1) comprises a step of mounting a user file system so that it can be read from and written to by said ordinary user, wherein said file system stores user data.

11. A computer-based system which controls modification of an operating system and an approved application set of zero or more approved applications on a computer, the computer-based system comprising:
 (a) the operating system;
 (b) the approved application set;
 (c) trusted path mechanism means for reliably establishing a trusted path between an administrator and the operating system;
 (d) a protected media comprising a non-volatile storage device, the protected media also comprising,
  (i) an operating system portion stored in said non-volatile storage device, wherein said operating system portion can be modified only by said administrator once said trusted path mechanism means has established said trusted path, said operating system portion comprising said operating system,
  (ii) an application/data portion stored in said non-volatile storage device, wherein said application/data portion can be modified only by said administrator once said trusted path mechanism means has established said trusted path, said application/data portion comprising said approved application set, and
  (iii) an internal operating system portion, stored in said non-volatile storage device;
 (e) initialization means for loading the operating system into a volatile memory of the computer from said protected media, and for executing the operating system; and
 (f) means for enabling the administrator to modify data stored in said protected media once said trusted path mechanism means has established said trusted path.

12. The computer-based system of claim 11, wherein said application/data portion also stores an approved data set of zero or more approved data.

13. The computer-based system of claim 11, wherein said protected media is represented by a file system which is mounted so that it cannot be modified by said application program or said ordinary user.

14. The computer-based system of claim 11, wherein said protected media further comprises a swap/page portion which cannot be modified by said application program or said ordinary user and which is used by the operating system for its internal purposes.

15. The computer-based system of claim 11, further comprising a user media which stores user data and which can be modified by said application program and said ordinary user.

16. The computer-based system of claim 15, wherein said user media comprises a file system which is mounted so that it can be modified by said application program and said ordinary user.

17. The computer-based system of claim 11, wherein said trusted path mechanism means comprises means for bringing the operating system into a single user mode.

18. The computer-based system of claim 11, wherein said trusted path mechanism means comprises means for restricting requests from said administrator to input from a particular input terminal electrically coupled to the computer.

19. The computer-based system of claim 11, wherein the operating system further comprises a trusted path program which can be invoked by said administrator in a trusted path mode of said operating system in order to modify the operating system.

20. A computer-based system which reliably audits the usage of a computer, comprising:
 (a) an operating system;
 (b) an audit log;
 (c) trusted path mechanism means for reliably establishing a trusted path between an administrator and said operating system;
 (d) a protected media comprising a non-volatile storage device, and also comprising,
  (i) an operating system portion which is stored in said non-volatile storage device, and which can be modified only by said administrator once said trusted path mechanism means has established said trusted path, said operating system portion comprising said operating system,
  (ii) an audit portion which is stored in said non-volatile storage device, and which can be modified only by said administrator once said trusted path mechanism means has established said trusted path, said audit portion comprising said audit log, and
  (iii) an internal operating system portion, stored in said non-volatile storage device;
 (e) initialization means for loading said operating system into a volatile memory of the computer from said protected media, and for executing said operating system;
 (f) means for collecting audit data; and
 (g) means for writing said audit data to said audit log.

21. The computer-based system of claim 20, further comprising a user media which stores user data and which can be modified by said application program and said ordinary user.

22. The computer-based system of claim 20, wherein said protected media further comprises an application/data portion which can be modified by said administrator but cannot be modified by said application program or said ordinary user and which stores an approved application set of zero or more approved applications.

23. The computer-based system of claim 20, wherein said operating system further comprises a trusted path program which can be invoked by said administrator in a trusted path mode of said operating system in order to modify said operating system.

24. The computer-based system of claim 20, wherein said operating system further comprises a trusted path program which can be invoked by said administrator in a trusted path mode of said operating system in order to modify audit configuration data, wherein said audit configuration data indicates what audit data is collected, and wherein said audit configuration data is stored in said audit portion.

25. The computer-based system of claim 20, wherein said means for collecting said audit data comprises means for collecting user activity data.

26. The computer-based system of claim 20, wherein said means for collecting said audit data comprises means for collecting system status data.

27. The computer-based system of claim 20, further comprising means for halting the computer if there is no room on said protected media to write said audit data.

28. The computer-based system of claim 20, further comprising means for deleting existing audit data from said audit log if there is no room on said protected media to write said audit data.

29. A computer-based method for restricting which programs can be executed on a computer, the computer-based method comprising the steps of:
 (1) loading an operating system from a protected media into a memory of the computer and executing said operating system, said operating system having a trusted path mode and a general purpose mode;
 (2) in said trusted path mode, carrying out a request by an administrator to modify an approved application set which resides on said protected media;
 (2a) exiting said trusted path mode and entering said general purpose mode upon detecting a request to do so by an administrator;
 (3) in said general purpose mode,
  (a) denying any request by an application program or an ordinary user to modify said operating system;
  (b) denying any request by said application program or said ordinary user to modify said approved application set; and
  (c) denying any request by said application program or said ordinary user to execute any application program which is not in said approved application set; and
 (4) repeating steps (2) and (3) as required.

30. The method of claim 29, further comprising a step of carrying out a request to enter said trusted path mode of step (2), wherein said request is made by said administrator in said general purpose mode of step (3).

31. The method of claim 29, further comprising a step of carrying out a request to modify said operating system, wherein said request is made by said administrator in said trusted path mode of step (2).

32. The method of claim 29, further comprising a step of carrying out a request by said application program or said ordinary user to modify user data.

33. The method of claim 29, further comprising the steps of:
 (5) carrying out a request to modify an approved data set of zero or more approved data, wherein said request is made by said administrator in said trusted path mode of step (2); and
 (6) capturing and denying any request to modify said approved data set, wherein said request is made by said application program or said ordinary user.

* * * * *